United States Patent
Niwa et al.

(10) Patent No.: US 9,567,779 B2
(45) Date of Patent: Feb. 14, 2017

(54) LID LOCK APPARATUS FOR VEHICLE

(71) Applicant: AISIN SEIKI KABUSHIKI KAISHA, Kariya-shi (JP)

(72) Inventors: Takumi Niwa, Kariya (JP); Toshihiro Kitamura, Nagoya (JP); Hiroshi Ban, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 538 days.

(21) Appl. No.: 13/920,620

(22) Filed: Jun. 18, 2013

(65) Prior Publication Data
US 2013/0341938 A1 Dec. 26, 2013

(30) Foreign Application Priority Data
Jun. 25, 2012 (JP) ................................. 2012-142400

(51) Int. Cl.
 *B60K 15/05* (2006.01)
 *E05B 83/34* (2014.01)
 (Continued)

(52) U.S. Cl.
 CPC ............... *E05B 83/34* (2013.01); *E05B 77/34* (2013.01); *E05B 81/16* (2013.01); *E05B 81/36* (2013.01);
 (Continued)

(58) Field of Classification Search
 CPC ............... B60K 2015/0576; B60K 2015/0584; E05B 77/34; E05B 2015/0403; E05B 2015/0406; E05B 2015/0437; E05B 2015/0441
 (Continued)

(56) References Cited

U.S. PATENT DOCUMENTS

| 6,793,266 B2 * | 9/2004 | Park .................... B60K 15/05 220/86.2 |
| 2010/0237633 A1 * | 9/2010 | Jankowski .............. E05B 77/06 292/216 |

(Continued)

FOREIGN PATENT DOCUMENTS

| DE | 102010040522 | * 3/2012 | ............... H02K 5/10 |
| JP | S59-185374 U | 12/1984 | |

(Continued)

OTHER PUBLICATIONS

Office Action issued on Jan. 6, 2016, by the Japanese Patent Office in corresponding Japanese Patent Application No. 2012-142400, and an English Translation of the Office Action. (8 pages).

*Primary Examiner* — Kristina Fulton
*Assistant Examiner* — Thomas Neubauer
(74) *Attorney, Agent, or Firm* — Buchanan Ingersoll & Rooney PC

(57) ABSTRACT

A lid lock apparatus for a vehicle includes a housing, a moving member supported within the housing, and a biasing member to bias the moving member in a direction in which the moving member engages with the lid member, the biasing member including a coil portion wound in a spiral shape and arranged at a lower side of the moving member so that an axial center of the coil portion is in a skewed position relative to an axis of the moving member, a fixed arm extending from a first end portion of the coil portion to engage with the housing, and a moving arm extending from a second end portion of the coil portion to engage with the moving member, the moving arm being deflected in a circumferential direction of the coil portion relative to the fixed arm by a movement of the moving member.

9 Claims, 8 Drawing Sheets

(51) Int. Cl.
*E05B 81/36* (2014.01)
*E05B 77/34* (2014.01)
*E05B 81/16* (2014.01)
*E05B 81/06* (2014.01)
*E05B 81/90* (2014.01)

(52) U.S. Cl.
CPC .............. *B60K 2015/0576* (2013.01); *B60K 2015/0584* (2013.01); *E05B 81/06* (2013.01); *E05B 81/90* (2013.01); *Y10T 292/097* (2015.04)

(58) Field of Classification Search
USPC ........................................... 292/1, 201, 216
See application file for complete search history.

(56) References Cited

U.S. PATENT DOCUMENTS

| | | | | |
|---|---|---|---|---|
| 2012/0313385 | A1* | 12/2012 | Akizuki | E05B 85/26 292/216 |
| 2013/0154402 | A1* | 6/2013 | Basavarajappa | B60K 15/05 310/20 |

FOREIGN PATENT DOCUMENTS

| | | |
|---|---|---|
| JP | S60-44829 U | 3/1985 |
| JP | 2001-065658 A | 3/2001 |

* cited by examiner

LID LOCK APPARATUS FOR VEHICLE

CROSS REFERENCE TO RELATED APPLICATIONS

This application is based on and claims priority under 35 U.S.C. §119 to Japanese Patent Application 2012-142400, filed on Jun. 25, 2012, the entire content of which is incorporated herein by reference.

TECHNICAL FIELD

This disclosure generally relates to a lid lock apparatus for a vehicle.

BACKGROUND DISCUSSION

A known technique related to a lid lock apparatus is disclosed in JP2001-65658A, which will be hereinafter referred to as Reference 1, for retaining a fuel filler lid serving as a lid member provided at a vehicle body in a closed state. According to the lid lock apparatus disclosed in Reference 1, a lock shaft serving as a moving member is accommodated within a housing so as to be movable in an axial direction. A compression spring is disposed between the moving member and the housing to bias the moving member towards the lid member.

The moving member biased by the compression spring projects from the housing so that an end portion of the moving member engages with the lid member. As a result, the lid member is held in the closed state. The moving member is brought to a locked state accordingly. The lid member, which selectively opens and closes a fuel filler box within which a fuel filler is accommodated, is normally in the closed state except for time of refueling. At the time of refueling, a worm wheel is rotated by an electric motor to pull back the moving member that is connected to the worm wheel while the compression spring is being deflected. The engagement of the moving member with the lid member is released to thereby bring the moving member to an unlocked state.

The compression spring used for the lid lock apparatus disclosed in Reference 1 is elastically supported in a state where both end portions of the compression spring are held by a stepped portion formed at an outer peripheral surface of the moving member and a wall surface of the housing respectively while the moving member is inserted into an inner peripheral portion of the compression spring. Therefore, in a case where the moving member is assembled on the housing, the moving member is first inserted into the compression spring and thereafter is arranged at a predetermined position of the housing wile the compression spring is being compressed, which may lead to an assembly difficulty of the moving member.

In addition, according to the lid lock apparatus disclosed in Reference 1, the compression spring is arranged at the moving member and therefore an axial length thereof may increase. Thus, in a case of a reduced attachment space provided at a vehicle, mountability of the lid lock apparatus may be deteriorated.

A need thus exists for a lid lock apparatus for a vehicle which is not susceptible to the drawback mentioned above.

SUMMARY

According to an aspect of this disclosure, a lid lock apparatus for a vehicle includes a housing, a moving member supported within the housing to be movable in a front and rear direction of a vehicle, one end of the moving member being configured to project from the housing to engage with a lid member provided at a vehicle body to inhibit the lid member from opening, the moving member being configured to retract in an axial direction to be away from the lid member by an operation of an opener provided at the vehicle to release the engagement with the lid member, and a biasing member disposed between the housing and the moving member to bias the moving member in a direction in which the moving member engages with the lid member, the biasing member including a coil portion wound in a spiral shape and arranged at a lower side of the moving member so that an axial center of the coil portion is in a skewed position relative to an axis of the lock shaft, a fixed arm extending from a first end portion of the coil portion to engage with the housing, and a moving arm extending from a second end portion of the coil portion to engage with the moving member, the moving arm being deflected in a circumferential direction of the coil portion relative to the fixed arm by a movement of the moving member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 2:
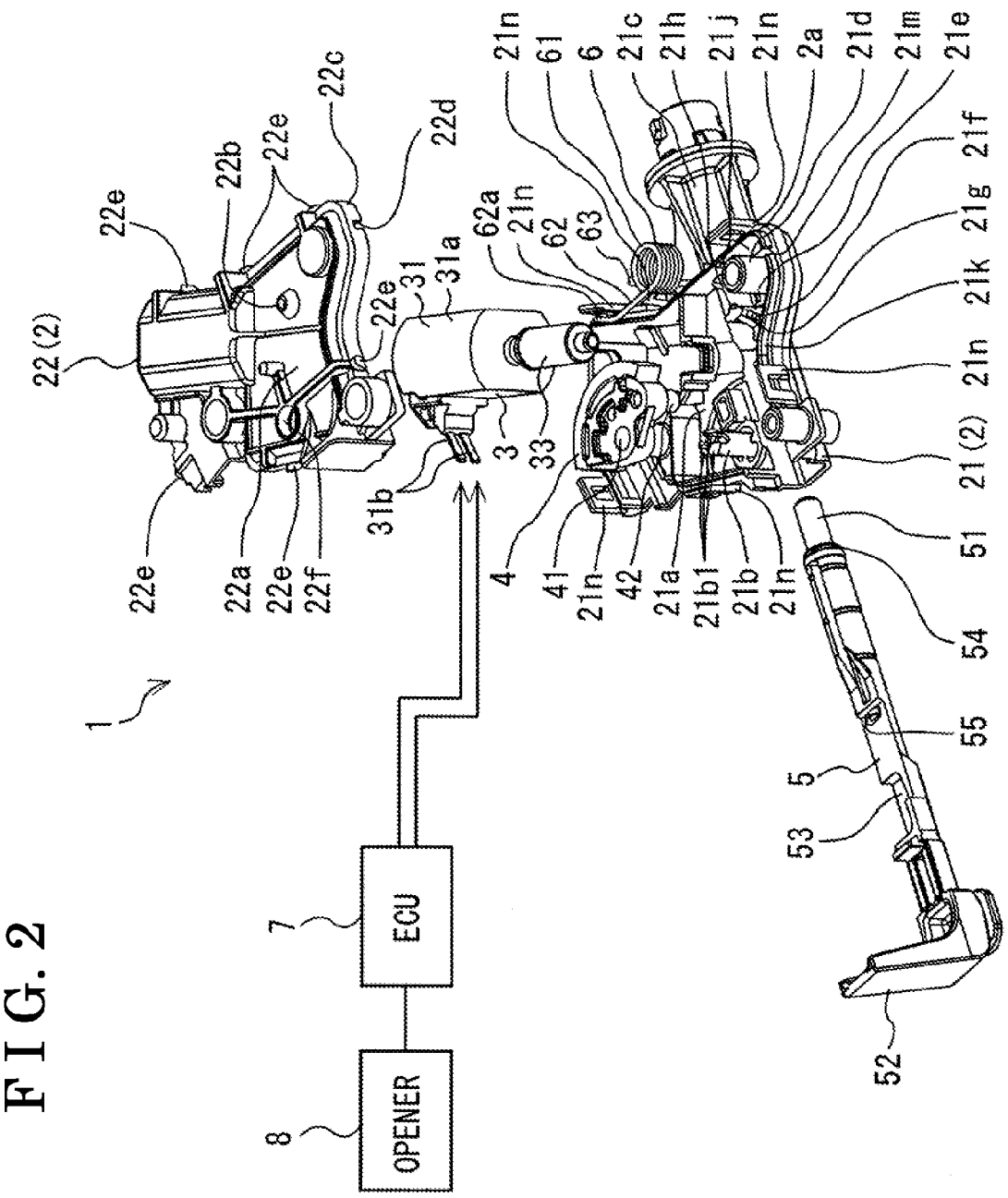
FIG. 2 is an exploded perspective view of the lid lock apparatus illustrated in FIG. 1.
Figure 3:
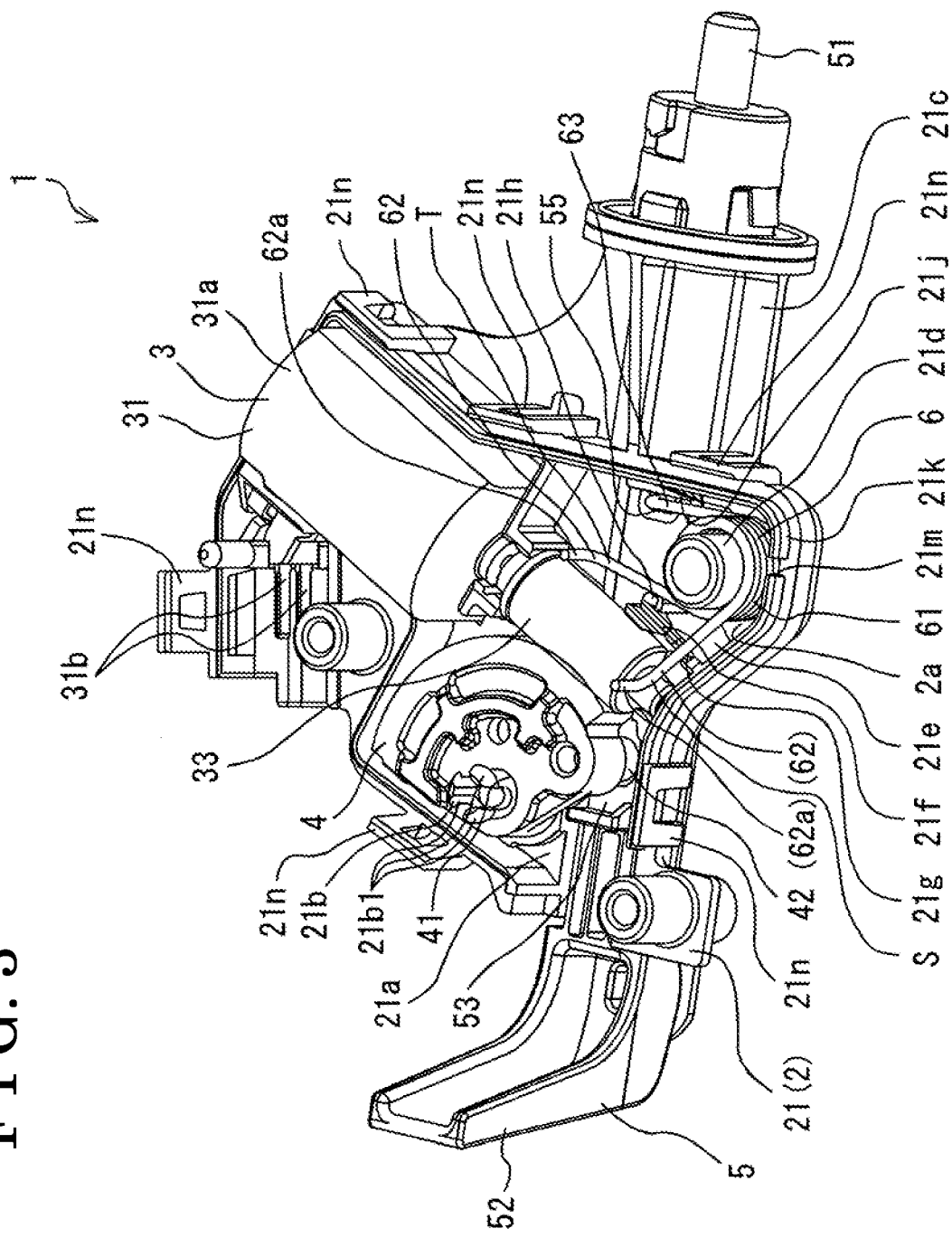
FIG. 3 is a perspective view of the lid lock apparatus in a state where an inside of the lid lock apparatus is viewed by removing a cover.
Figure 4:
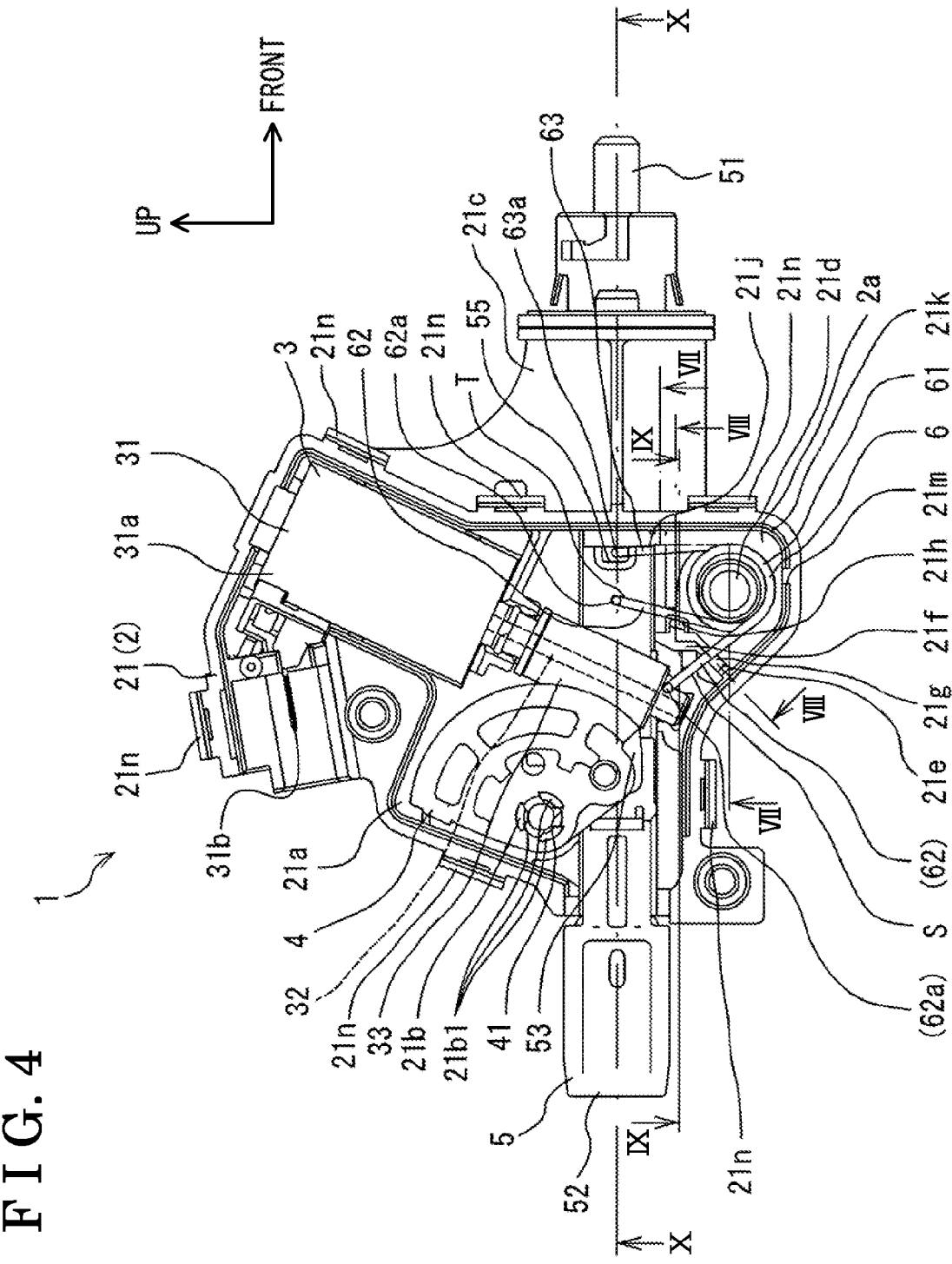
FIG. 4 is a front view of the lid lock apparatus illustrated in FIG. 3.

A fuel lid lock apparatus 1 (which will be hereinafter referred to as a lid lock apparatus 1) serving as a lid lock apparatus for a vehicle according to an embodiment will be explained with reference to FIGS. 1 to 10. The lid lock apparatus 1 includes a lock shaft 5 serving as a moving member of which one end is configured to project to engage with a fuel lid (a fuel filler lid) 91 serving as a lid member. The lid lock apparatus 1 is mounted at a vehicle V in a state where the aforementioned one end of the lock shaft 5 is positioned to face forward of the vehicle V and a motor body 31 of an electric motor 3 is arranged at an upper side in the lid lock apparatus 1 as illustrated in FIG. 4. Unless specifically noted, hereinafter an explanation will be based on that a right side in FIG. 4 corresponds to a front side of the lid lock apparatus 1 while an upper side in FIG. 4 corresponds to an upper side of the lid lock apparatus 1.

Figure 1:
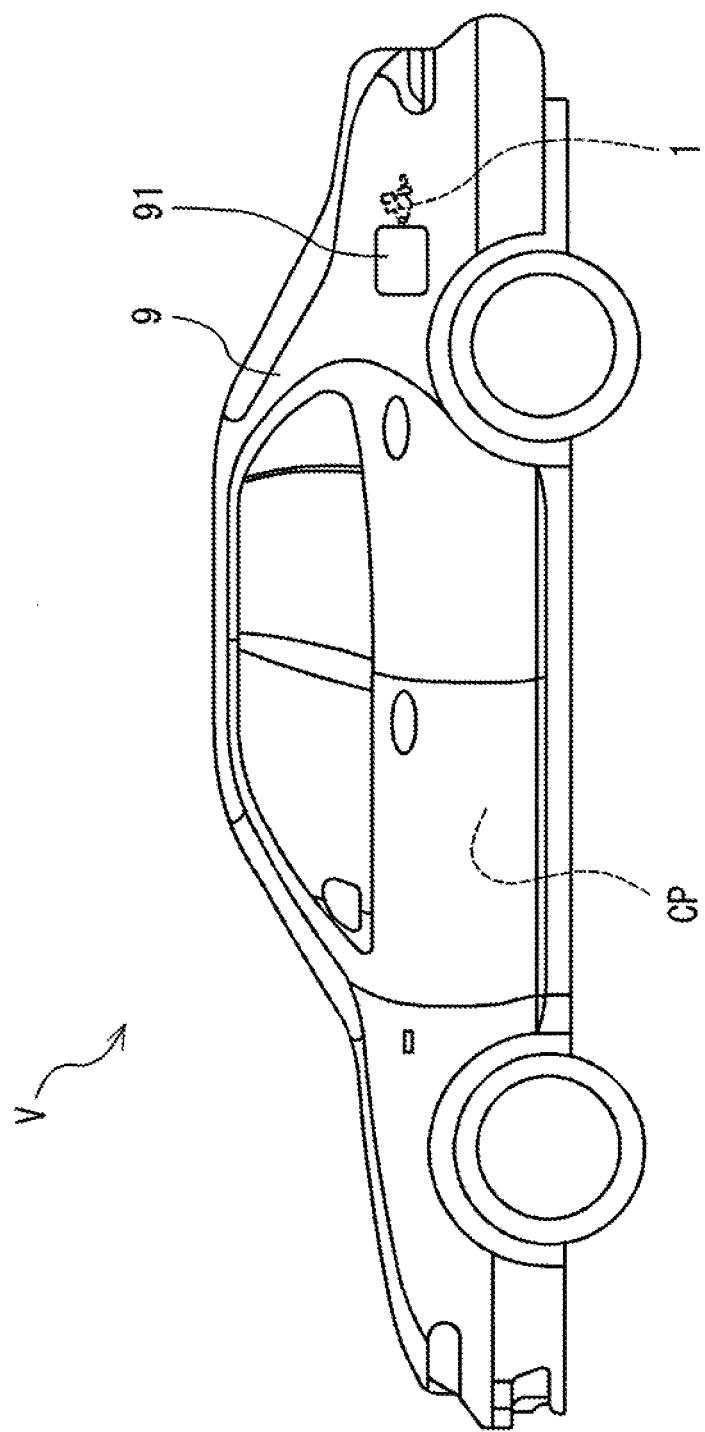
FIG. 1 is a front view of a vehicle at which a lid lock apparatus for a vehicle according to an embodiment disclosed here is mounted.

As illustrated in FIG. 1, the lid lock apparatus 1 is mounted at an inside of a vehicle body 9 so as to be positioned immediately rearward of the fuel lid 91 at the vehicle V. As illustrated in FIGS. 2 and 3, the lid lock apparatus 1 of the embodiment includes a body 21 serving as a first body and a cover 22 serving as a second body to form an actuator housing 2 (which will be hereinafter referred to as a housing 2) serving as a housing. The electric motor 3 serving as a drive motor, a worm wheel 4, the lock shaft 5, and a torsion spring 6 serving as a biasing member are accommodated within the housing 2. Each of the body 21 and the cover 22 is made of synthetic resin. The body 21 and the cover 22 are fitted to be integrally arranged after the aforementioned internal components are accommodated within the housing 2.

The motor body 31 of the electric motor 3 includes a motor housing 31a, a stator fixed within the motor housing 31a, and a rotor attached to the stator so as to be rotatable relative to the stator. As illustrated in FIG. 4, an output shaft 32 serving as an output shaft projects from the motor body 31. In the housing 2, the motor body 31 is arranged at an upper side of the lock shaft 5. The output shaft 32 extends obliquely downward from the motor body 31. The output shaft 32 is press-fitted to a worm 33, the worm 33 being rotatable by the motor body 31. A toothed portion is formed at an outer peripheral surface of the worm 33.

The worm wheel 4 includes a pivot bore 41 fitted to a wheel shaft 21b that projects from a wall surface 21a, serving as an inner wall surface, of the body 21. The worm wheel 4 is rotatable about the wheel shaft 21b relative to the body 21. Plural hook portions 21b1 are formed at an end portion of the wheel shaft 21b so as to deflect radially inwardly of the wheel shaft 21b. In a state where the worm wheel 4 is attached to the body 21, each of the hook portions 21b1 projects from an end surface of the worm wheel 4. As explained later, each of the hook portions 21b1 forms a snap-fit fastener together with a support shaft bore 22f formed at the cover 22. The worm wheel 4 also includes an engagement projection 42 (see FIG. 2) that projects towards the wall surface 21a of the body 21. A toothed portion is formed at an outer peripheral surface of the worm wheel 4 in arc form so as to engage with the toothed portion of the worm 33.

As illustrated in FIG. 2, a controller (ECU) 7 formed at the vehicle V is electrically connected to a pair of terminals 31b of the motor body 31. In addition, an opener 8 provided at a vehicle interior CP (see FIG. 1) is electrically connected to the controller 7. In a case where a driver of the vehicle V operates the opener 8 for refueling, an electric power is supplied to the electric motor 3 by the controller 7. As a result, the electric motor 3 is driven to rotate the worm wheel 4 via the worm 33.

The lock shaft 5, which is made of synthetic resin, is integrally formed in an elongated form. A front portion of the lock shaft 5 is inserted into a cylindrical sleeve 21c formed at the body 21 so that the lock shaft 5 is held to be movable in a front and rear direction of the vehicle V by the body 21. A lock portion 51 configured to engage with the fuel lid 91 is formed at a first end of the lock shaft 5, the first end corresponding to a right end of the lock shaft 5 in FIG. 4. A connection portion 52 is formed at a second end of the lock shaft 5, the second end corresponding to a left end of the lock shaft 5 in FIG. 4, so that a towing tool for emergency that is operated in the event of malfunction of the electric motor 3 is connected to the connection portion 52.

Figure 10:
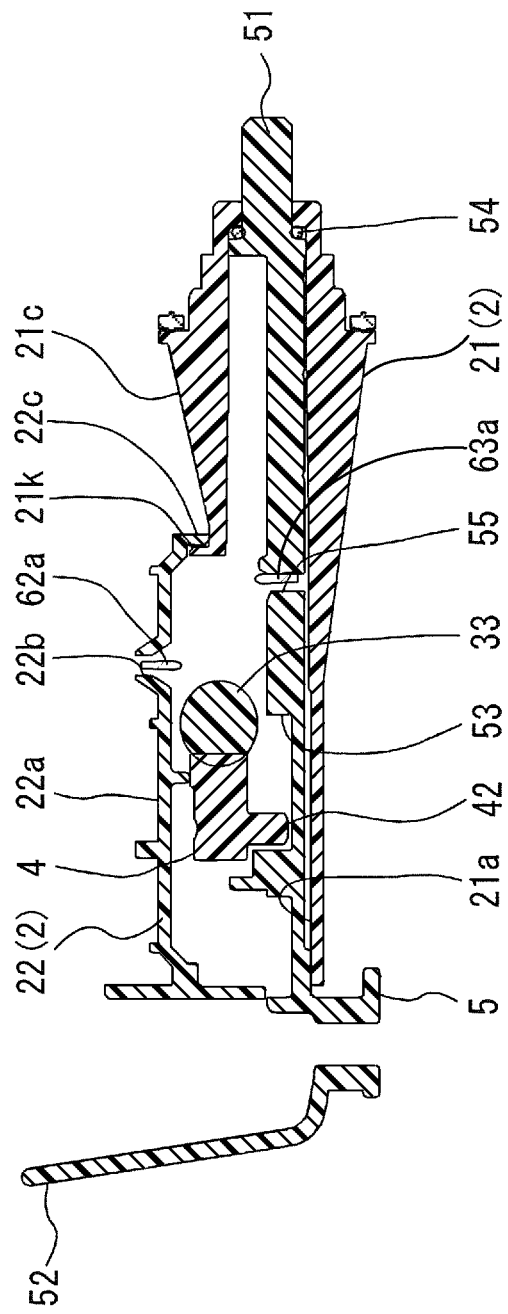
FIG. 10 is a cross-sectional view taken along line X-X in FIG. 5.

As illustrated in FIG. 2, an interlock bore 53 is formed at the lock shaft 5 in a way that an outer peripheral surface of the lock shaft 5 is recessed in a thickness direction thereof, i.e., in a direction perpendicular to an up and down direction of the lid lock apparatus 1. The engagement projection 42 formed at the worm wheel 4 is inserted into the interlock bore 53. A seal ring 54 made of synthetic rubber is attached to the outer peripheral surface of the lock shaft 5 that slides relative to an inner peripheral surface of the sleeve 21c. As illustrated in FIG. 10, the seal ring 54 inhibits water from entering the housing 2 from the fuel lid 91 through between the body 21 and the lock shaft 5 while the lock shaft 5 is moving. Further, a connection bore 55 is formed at the lock shaft 5 to be recessed in the same direction as the interlock bore 53.

The torsion spring 6 is assembled and attached within the housing 2. The torsion spring 6 includes a coil portion 61 formed by a spring wire rod that is wound in a spiral shape. As illustrated in FIG. 3, a lower end portion of the body 21 extends downward (i.e., a downwardly extending portion is formed). The lower end portion of the body 21 together with a lower end portion of the cover 22 that also extends downward form a spring accommodating portion 2a serving as an accommodating portion and as a void for accommodating the coil portion 61. As illustrated in FIG. 4, an extending amount of the spring accommodating portion 2a in the downward direction is greater than an extending amount of the output shaft 32 of the electric motor 3 in the downward direction. That is, the spring accommodating portion 2a extends further downward than the output shaft 32 of the electric motor 3.

An attachment boss 21d is formed at the downwardly extending portion of the body 21. The attachment boss 21d projects from the wall surface 21a of the body 21 into the spring accommodating portion 2a. The attachment boss 21d is inserted into an inner peripheral portion of the coil portion 61 to thereby attach the torsion spring 6 to the housing 2. As illustrated in FIG. 4, the coil portion 61 is arranged at the lower side of the lock shaft 5 and an axial center of the coil portion 61 is in a skewed position relative to an axis of the lock shaft 5. In addition, a distance from the coil portion 61 to the fuel lid 91 is shorter than a distance from the output shaft 32 to the fuel lid 91 in the front and rear direction of the vehicle V. That is, the coil portion 61 is positioned between the output shaft 32 of the electric motor 3 and the fuel lid 91 in the front and rear direction of the vehicle V.

As illustrated in FIG. 3, a fixed arm 62 that extends upward to engage with the body 21 is formed at a first end portion of the coil portion 61 while a moving arm 63 that extends upward to engage with the lock shaft 5 is formed at a second end portion of the coil portion 61. An end of the fixed arm 62 is substantially perpendicularly bent to the cover 22 (i.e., in a direction perpendicular to a sheet surface of FIG. 4) to thereby form a housing engagement portion 62a. An end of the moving arm 63 is substantially perpendicularly bent to the body 21 to form a shaft engagement portion 63a as illustrated in FIG. 4. The torsion spring 6 is symmetrically formed so that either of the fixed arm 62 and the moving arm 63 may engage with either of the housing 2 and the lock shaft 5.

Figure 9:
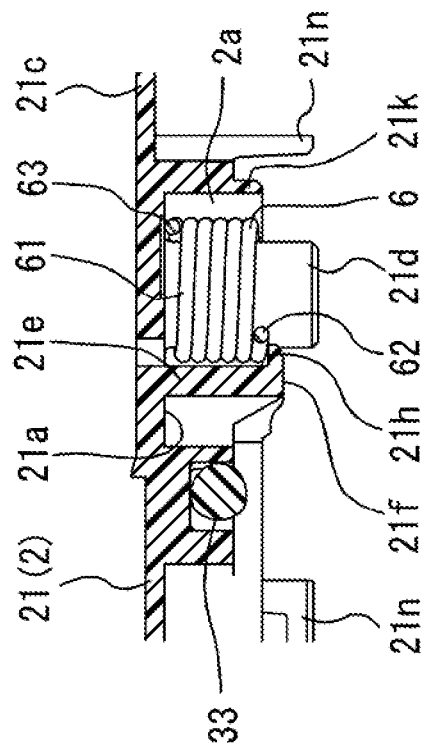
FIG. 9 is a cross-sectional view taken along line IX-IX in FIG. 4.
Figure 8:
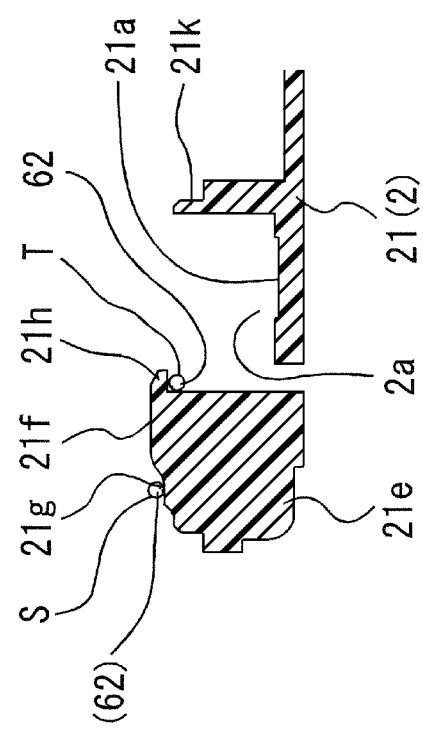
FIG. 8 is a cross-sectional view taken along line VIII-VIII in FIG. 4.

A spring fixation portion 21e in a wall form and serving as a spring attachment portion is formed to be positioned within the spring accommodating portion 2a of the body 21. The spring fixation portion 21e projects from the wall surface 21a in an axial direction of the coil portion 61. As illustrated in FIG. 8, a recessed portion 21g at which the fixed arm 62 is configured to be placed is formed at an end surface 21f, which is illustrated by a shaded area in FIG. 3, of the spring fixation portion 21e. In addition, an engagement hook 21h projects from an end portion of the spring fixation portion 21e in a circumferential direction of the coil portion 61 to engage with the fixed arm 62. As illustrated in FIG. 9, a length (a height) of the attachment boss 21d from the wall surface 21a is specified to be greater than a length (a height) of the engagement hook 21h from the wall surface 21a at the body 21.

Figure 7:
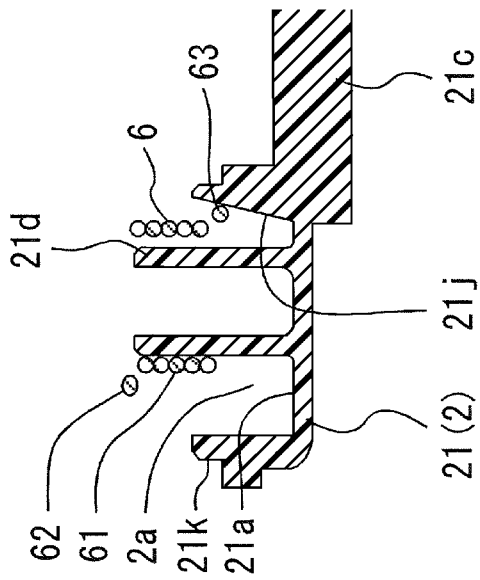
FIG. 7 is a cross-sectional view taken along line VII-VII in FIG. 4.

A guide portion 21j is formed at the wall surface 21a of the body 21 to be positioned in the vicinity of a peripheral edge of the connection bore 55 of the lock shaft 5. As illustrated in FIG. 3, the guide portion 21j is formed in the vicinity of a rear end portion of the sleeve 21c. As illustrated in FIG. 7, the guide portion 21j is formed such that an end surface thereof is inclined towards a center of the connection bore 55 in a depth direction of the connection bore 55 (i.e., in a downward direction in FIG. 7). That is, the guide portion 21j is downwardly inclined towards the center of the connection bore 55. In addition, a peripheral wall portion 21k is formed to surround the body 21. As illustrated in FIG. 3, a slit 21m is formed at a lower end portion of the body 21, i.e., at a lower end of the spring accommodating portion 2a, so as to connect between an inner side and an outer side of the body 21.

As illustrated in FIG. 2, a cover wall 22a serving as a wall member is formed at the cover 22 so as to face the wall surface 21a of the body 21 in a state where the cover 22 is fitted to the body 21. A fixation bore 22b serving as an end portion fixation bore is formed at the cover wall 22a to penetrate therethrough. The cover wall 22a is configured to cover the torsion spring 6 in a state where the cover 22 is fitted to the body 21. In addition, an outer wall 22c is formed at the cover 22 to surround a peripheral edge portion of the cover 22. A groove 22d is formed at a lower end portion of the outer wall 22c, i.e., at the lower end of the spring accommodating portion 2a, so as to be positionally match the slit 21m of the body 21. A configuration including the slit 21m and the groove 22d serves as a connection bore portion.

In a case where the torsion spring 6 is assembled within the housing 2, the shaft engagement portion 63a of the moving arm 63 is first inserted into the connection bore 55 of the lock shaft 5 that is arranged within the body 21. At this time, the fixed arm 62 is placed at the recessed portion 21g of the spring fixation portion 21e for positioning. The fixed arm 62 positioned at the recessed portion 21g is illustrated by "S" in FIGS. 3, 4, and 8. Afterwards, the fixed arm 62 placed at the recessed portion 21g is slid in a clockwise direction on the end surface 21f of the spring fixation portion 21e while the fixed arm 62 is being deflected.

The fixed arm 62 that has moved to an end portion of the spring fixation portion 21e on the end surface 21f engages with the engagement hook 21h. The fixed arm 62 positioned to engage with the engagement hook 21h is illustrated by "T" in FIGS. 3, 4, and 8. Accordingly, the torsion spring 6 is elastically disposed between the body 21 and the lock shaft 5. In a case where the fixed arm 62 engages with the engagement hook 21h, the torsion spring 6 biases the lock shaft 5 forward. At this time, because the connection portion 52 engages with a rear end portion of the body 21, the lock shaft 5 is inhibited from moving further forward.

In a case where the lid lock apparatus 1 is assembled as a whole, first, the lock shaft 5 is arranged at an appropriate position of the body 21. Then, after the torsion spring 6 engages with and assembled on the body 21 and the lock shaft 5 as mentioned above, the electric motor 3 provided with the worm 33 is arranged at an appropriate position of the body 21. Next, the pivot bore 41 of the worm wheel 4 is fitted to the wheel shaft 21b of the body 21 to thereby attach the worm wheel 4 to the body 21. At this time, the toothed portion formed at the outer peripheral surface of the worm wheel 4 is meshed with the toothed portion of the worm 33, and the engagement projection 42 is inserted into the interlock bore 53.

Figure 5:
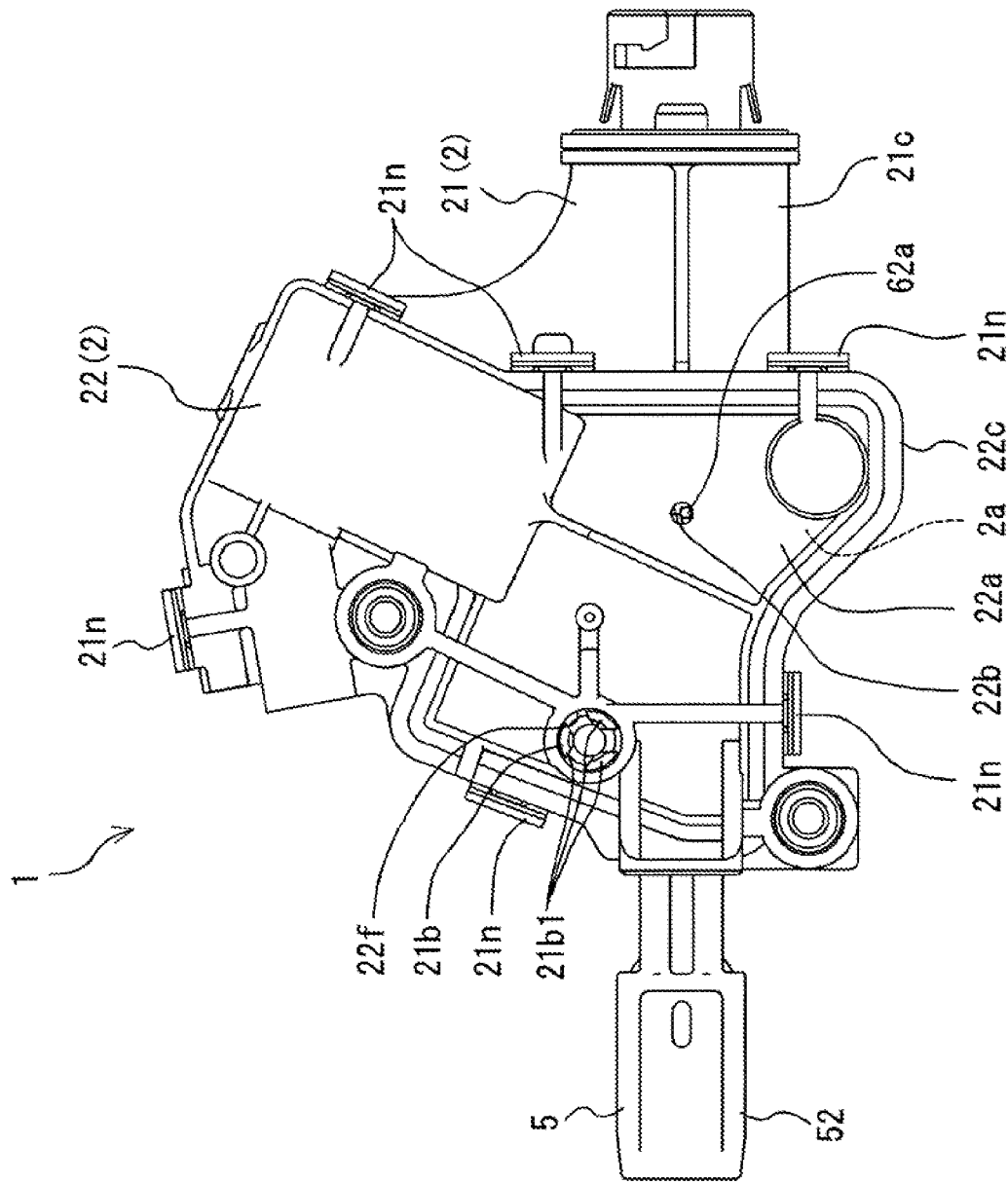
FIG. 5 is an outline view of the lid lock apparatus in an unlocked state.

Finally, in order to engage the peripheral wall portion 21k of the body 21 with the outer wall 22c of the cover 22, the cover 22 is fitted to the body 21 to completely assemble the lid lock apparatus 1. The body 21 and the cover 22 are fixed to each other in a state where plural engagement pieces 21n formed at the peripheral wall portion 21k of the body 21 elastically engage with plural projections 22e formed at the outer wall 22c of the cover 22. At this time, the hook portions 21b1 of the wheel shaft 21b engage with an opening portion of the support shaft bore 22f formed at the cover 22 so that the cover 22 is inhibited from being dislocated from the body 21 as illustrated in FIG. 5.

In the case where the body 21 engages with the cover 22, the housing engagement portion 62a of the fixed arm 62 fixed to the body 21 is inserted into the fixation bore 22b of the cover 22 as illustrated in FIG. 10. In addition, when the peripheral wall portion 21k of the body 21 engages with the outer wall 22c of the cover 22, the positions of the slit 21m of the body 21 and the groove 22d of the cover 22 match each other to thereby connect the spring accommodating portion 2a to the outside thereof, i.e., of the housing 2.

Figure 6:
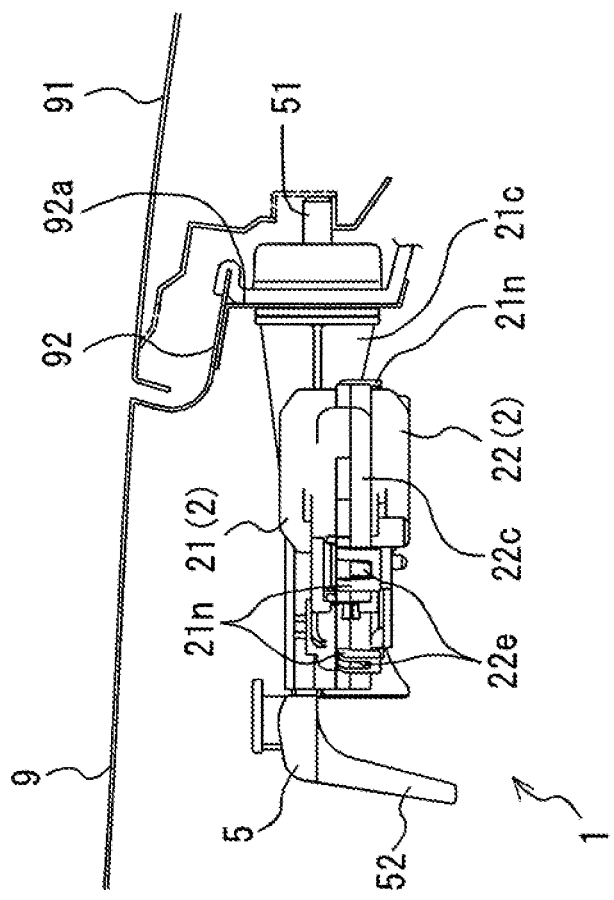
FIG. 6 is a diagram of the lid lock apparatus viewed from an upper side illustrating a state where a lock shaft engages with a fuel lid.

As illustrated in FIG. 6, the lid lock apparatus 1 is mounted at the vehicle body 9. A lid box 92 accommodating therein a fuel filler (a filler opening) is formed at the vehicle body 9. The lid box 92 opens and closes by the fuel lid 91. The lid lock apparatus 1 accommodating the components is attached to a support wall 92a of the lid box 92 in a state where a front portion of the lid lock apparatus 1 projects into the lid box 92. The lid lock apparatus 1 fluid-tightly interrupts or disconnects between inside and outside of the lid box 92 in a state to be attached to the support wall 92a. The lid lock apparatus 1 is mounted so as not to be dislocated from the vehicle body 9 in a case where the lock shaft 5 moves by the electric motor 3 and a case where the lock shaft 5 is pulled to a position at which the engagement of the lock shaft 5 with the fuel lid 91 is released by the towing tool for emergency.

As illustrated in FIG. 4, the lock shaft 5 receives a biasing force in a direction to engage with the fuel lid 91 (i.e., a biasing force in a forward direction) by the torsion spring 6 disposed between the lock shaft 5 and the housing 2 so as to project from the housing 2. The lock shaft 5 is arranged at a locked position accordingly. The lock shaft 5 is fixed to the locked position in a state where the connection portion 52 formed at a rear end of the lock shaft 5 makes contact with the rear end portion of the housing 2. The lock portion 51 projects from the housing 2 into the lid box 92 to engage with the fuel lid 91. As a result, the fuel lid 91 is held to be inhibited from opening as illustrated in FIG. 6.

When the opener 8 is operated in a state where the lock shaft 5 is at the locked position, the electric motor 3 is operated under a predetermined operation condition to thereby rotate the worm wheel 4 in a clockwise direction in FIG. 4. Accordingly, the lock shaft 5 that engages with the worm wheel 4 via the engagement projection 42 and the interlock bore 53 is retracted in the axial direction (i.e., moves in the rearward direction) relative to the housing 2 to be away from the fuel lid 91 against the biasing force of the torsion spring 6. The lock portion 51 is then retracted and stored within the housing 2 as illustrated in FIG. 5. That is, the lock portion 51 is arranged at an unlocked position. The lock portion 51 that is retracted disengages from the fuel lid 91 so that the fuel lid 91 may be opened. When the lock shaft 5 is retracted, the moving arm 63 of the torsion spring 6 may be deflected in the circumferential direction of the coil portion 61 relative to the fixed arm 62.

The movement of the lock shaft 5 retracted within the housing 2 is stopped when the worm wheel 4 that is rotated or the lock shaft 5 that is retracted makes contact with the housing 2. The controller 7 detects a load current of the electric motor 3 that is generated when the lock shaft 5 stops moving, and then stops the electric supply to the electric motor 3. The controller 7 may stop the electric supply after the electric motor 3 is operated for a predetermined time period that is specified by a timer.

The fuel lid 91 that once disengages from the lock shaft 5 is opened by a biasing force of an opening spring. When the operation of the electric motor 3 is stopped thereafter, the lock shaft 5 is biased by the torsion spring 6 so that the lock shaft 5 again projects into the lid box 92. At this time, however, the lock shaft 5 is inhibited from engaging with the fuel lid 91 in the open state. When refueling is finished and the fuel lid 91 is pressed by a use's hand, the fuel lid 91 moves in a direction to be closed while the lock shaft 5 is being pushed back against the biasing force of the torsion spring 6. The fuel lid 91 that returns to the closed position engages with the lock shaft 5 to be held again by the lock shaft 5.

According to the present embodiment, the coil portion 61 of the torsion spring 6 is wound in spiral form and arranged within the spring accommodating portion 2a positioned at the lower side of the lock shaft 5. The axial center of the coil portion 61 is in a skewed position relative to the axis of the lock shaft 5. In addition, the fixed arm 62 extends upward from the first end portion of the coil portion 61 to engage with the housing 2 while the moving arm 63 extends upward from the second end portion of the coil portion 61 to engage with the lock shaft 5. Accordingly, after the lock shaft 5 is assembled on the housing 2, the torsion spring 6 may be mounted between the housing 2 and the lock shaft 5. It is not necessary to assemble the lock shaft 5 on the housing 2 while the spring member (the torsion spring 6) is being compressed. The lid lock apparatus 1 that is easily manufactured is obtainable.

In addition, the torsion spring 6 is arranged by utilizing a space formed at the lower side of the lock shaft 5. Thus, the torsion spring 6 is inhibited from interfering with the other components of the vehicle V. The lid lock apparatus 1 may be easily mounted to the vehicle V. Specifically, when the lid lock apparatus 1 is mounted to the vehicle V, a space for the lid lock apparatus 1 may not be sufficient in the front and rear direction of the vehicle V because of an interference with the lid box 92 and/or a luggage room. On the other hand, a space may be relatively sufficient in the up and down direction (a vertical direction) in the vehicle body 9. According to the lid lock apparatus 1 of the present embodiment, the torsion spring 6 is arranged by utilizing a space, i.e., a dead space, formed at the lower side of the lock shaft 5.

In a case where a compression spring is disposed between a stepped portion of a moving member corresponding to the lock shaft 5 and a housing corresponding to the housing 2 and thus an engagement area between an end portion of the compression spring and the housing is small as in a known lid lock apparatus for a vehicle disclosed in JP2001-65658A, for example, the compression spring may not be stably attached to the housing. Thus, because of vehicle vibration, for example, the end portion of the compression spring may enter an insertion bore formed at the housing, the insertion bore into which the moving member is configured to be inserted. The compression spring is inhibited from stably biasing the moving member, which may lead to an unstable operation of the moving member. On the other hand, according to the lid lock apparatus 1 of the present embodiment, the torsion spring 6 is mounted via the fixed arm 62, the moving arm 63, and the coil portion 61 between the housing 2 (the body 21) and the lock shaft 5. Thus, the torsion spring 6 is inhibited from being dislocated from the body 21 or the lock shaft 5 by vehicle vibration, for example, so that the lock shaft 5 may be stably biased.

In addition, according to the present embodiment, the torsion spring 6 is mounted to the body 21 and the lock shaft 5 via the fixed arm 62 and the moving arm 63. Thus, as compared to a case where the compression spring is disposed between the body 21 and the lock shaft 5, variations of mounting length of the torsion spring 6 may be reduced. Thus, a mounting load of the torsion spring 6 is stabilized to thereby decrease variations of biasing force of the torsion spring 6 relative to the lock shaft 5. In addition, because of the stable mounting load of the torsion spring 6, an output torque of the electric motor 3 decreases, which may lead to a downsizing of the electric motor 3. Further, because the lock shaft 5 is inhibited from being inserted to the inner peripheral portion of the torsion spring 6, the lock shaft 5 may be formed irrelevant to the size of the torsion spring 6.

Further, the coil portion 61 is positioned between the output shaft 32 of the electric motor 3 and the fuel lid 91 in the front and rear direction of the vehicle V. Thus, even in a case where rainwater enters from the fuel lid 91, for example, such rainwater is stored and collected in the spring accommodating portion 2a serving as the space where the coil portion 61 is arranged. Water such as rainwater may be inhibited from flowing to the electric motor 3 accordingly. In addition, the slit 21m is formed at the lower end portion of the peripheral wall portion 21k of the body 21 and the groove 22d is formed at the lower end portion of the outer wall 22c of the cover 22 so that the inside and the outside of the housing 2 are connected to each other. Thus, even in a case where water is stored in the space where the coil portion 61 is arranged (in the spring accommodating portion 2a where the coil portion 61 is accommodated), such water may be discharged to the outside of the housing 2. Further, the motor body 31 is arranged at the upper side of the lock shaft 5. Thus, water is inhibited from entering the motor body 31.

The torsion spring 6 is arranged at substantially a center portion of the lid lock apparatus 1 in the front and rear direction of the lid lock apparatus 1. Thus, a weight is centralized to the center portion to thereby arrange a gravity center of the lid lock apparatus 1 to the center portion. Therefore, even when a vibration occurs at the vehicle V, an unbalanced load may not be generated at the lid lock apparatus 1. A damage of the lid lock apparatus 1 may be inhibited accordingly.

In addition, the recessed portion 21g is provided at the end surface 21f of the spring fixation portion 21e so that the fixed arm 62 may be placed at the recessed portion 21g. Thus, in the process of engaging the moving arm 63 with the lock shaft 5, the fixed arm 62 is temporarily placed at the recessed portion 21g for positioning. The mountability of the moving arm 63 (the torsion spring 6) relative to the lock shaft 5 may be improved. Further, in a case of assembling the torsion spring 6 on the body 21, the moving arm 63 first engages with the lock shaft 5 and then the fixed arm 62 placed at the recessed portion 21g is moved on the end surface 21f so as to engage with the engagement hook 21h. As a result, the fixed arm 62 may easily engage with the engagement hook 21h. Furthermore, the length of the attachment boss 21d from the wall surface 21a, the attachment boss 21d at which the coil portion 61 is attached, is specified to be greater than the length of the engagement hook 21h from the wall surface 21a at the body 21. Thus, when the fixed arm 62 moves on the end surface 21f, the torsion spring 6 is inhibited from falling to thereby improve the mountability thereof.

The fixation bore 22b, into which the housing engagement portion 62a of the fixed arm 62 is inserted, penetrates through the cover wall 22a of the cover 22 that faces the wall surface 21a of the body 21 in a case where the cover 22 is fitted to the body 21. Thus, the housing engagement portion 62a (the fixed arm 62) is held by the cover 22. As a result, even in a case where a vibration occurs at the vehicle V, for example, the fixed arm 62 is inhibited from disengaging from the engagement hook 21h (the housing 2) to thereby stably bias the lock shaft 5. In addition, a state where the fixed arm 62 engages with the cover 22 is visually confirmed from the outside of the housing 2 via the fixation bore 22b. The reliability of the lid lock apparatus 1 may be therefore improved.

Further, the guide portion 21j is provided at the body 21 in the vicinity of the connection bore 55 (around the connection bore 55) that is formed at the lock shaft 5. The guide portion 21j is formed to incline towards the center of the connection bore 55 in the depth direction thereof. Thus, the moving arm 63 guided by the guide portion 21j may easily engage with the connection bore 55 to thereby improve the mountability of the lid lock apparatus 1. Furthermore, the torsion spring 6 is symmetrically formed so that either of the fixed arm 62 and the moving arm 63 may engage with either of the body 21 and the lock shaft 5. Thus, a positional orientation of the torsion spring 6 relative to the body 21 (the housing 2) and the lock shaft 5 may be ignored to thereby further improve the mountability of the lid lock apparatus 1.

The aforementioned embodiment may be appropriately modified or changed as follows. The lid lock apparatus 1 may be mounted in a state where an end of the lock portion 51 of the lock shaft 5 projecting from the housing 2 so as to engage with the fuel lid 91 faces rearward of the vehicle V. In addition, the lid lock apparatus 1 may be manually operated, without using the electric motor 3, by connecting the opener 8 and the lock shaft 5 by a cable or a link. Then, the lock shaft 5 may be retracted by the operation of the opener 8 via the cable or the link. Further, each length and extending direction of the fixed arm 62 and the moving arm 63 may be appropriately specified depending on design specifications. Furthermore, the lid lock apparatus 1 of the embodiment may be not only applied to a lid for covering a fuel filler but also applied to an apparatus for holding a trunk lid of the vehicle V in a closed state.

According to the aforementioned embodiment, the lid lock apparatus 1 further includes the electric motor 3 accommodated within the housing 2 and operated by the operation of the opener 8, the electric motor 3 driving the lock shaft 5 to retract against a biasing force of the torsion spring 6. The coil portion 61 is arranged in a state where a distance from the coil portion 61 to the fuel lid 91 is shorter than a distance from the output shaft 32 of the electric motor 3 connected to the lock shaft 5 to the fuel lid 91.

In addition, according to the aforementioned embodiment, the housing 2 includes the spring accommodating portion 2a that extends in the downward direction to accommodate the coil portion 61. The extending amount of the spring accommodating portion 2a in the downward direction is greater than the extending amount of the output shaft 32 of the electric motor 3 in the downward direction.

Further, according to the aforementioned embodiment, the connection bore portion, i.e., the slit 21m and the groove 22d, is formed at the lower end portion of the spring accommodating portion 2a to connect inside and outside of the housing 2.

Furthermore, according to the aforementioned embodiment, the electric motor 3 includes the motor body 31 rotating the output shaft 32, the motor body 31 being arranged at the upper side of the lock shaft 5.

Furthermore, according to the aforementioned embodiment, the housing 2 includes the spring fixation portion 21e projecting from the wall surface 21a of the housing 2 and including the end surface 21f, the end surface 21f including the recessed portion 21g at which the fixed arm 62 is configured to be placed, the engagement hook 21h projecting from the spring fixation portion 21e in the circumferential direction of the coil portion 61. In a case of mounting the torsion spring 6 at the housing 2, the moving arm 63 engages with the lock shaft 5 and thereafter the fixed arm 62 placed at the recessed portion 21g moves on the end surface 21f to engage with the engagement hook 21h.

Furthermore, according to the aforementioned embodiment, the attachment boss 21d projecting from the wall surface 21a of the housing 2 is inserted into the inner peripheral portion of the coil portion 61. A length of the attachment boss 21d from the wall surface 21a is specified to be greater than a length of the engagement hook 21h from the wall surface 21a.

Furthermore, according to the aforementioned embodiment, the housing 2 includes the body 21 at which the spring fixation portion 21e is formed and the cover 22 configured to be fitted to the body 21. The fixation bore 22b penetrates through the cover wall 22a of the cover 22 facing the wall surface 21a of the body 21 in a case where the body 21 is fitted to the cover 22, the end portion of the fixed arm 62 being inserted into the fixation bore 22b in a case where the body 21 is fitted to the cover 22.

Furthermore, according to the aforementioned embodiment, the lock shaft 5 includes the connection bore 55 engaging with the moving arm 63, and the guide portion 21j is formed at the housing 2 to be positioned around the connection bore 55 to incline towards the center of the connection bore 55 in a depth direction of the connection bore 55.

Furthermore, according to the aforementioned embodiment, the torsion spring 6 is symmetrically formed so that either of the fixed arm 62 and the moving arm 63 is configured to engage with either of the housing 2 and the lock shaft 5.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lid lock apparatus for a vehicle, comprising:
a housing;
a moving member supported within the housing to be movable in a front and rear direction of a vehicle, one end of the moving member being configured to project from the housing to engage with a lid member provided at a vehicle body to inhibit the lid member from opening, the moving member being configured to retract in an axial direction to be away from the lid member by an operation of an opener provided at the vehicle to release the engagement with the lid member;
a biasing member disposed between the housing and the moving member to bias the moving member in a direction in which the moving member engages with the lid member, the biasing member including a coil portion wound in a spiral shape and arranged at a lower side of the moving member so that an axial center of the coil portion is in a skewed position relative to an axis of the moving member, a fixed arm extending from a first end portion of the coil portion to engage with the housing, and a moving arm extending from a second end portion of the coil portion to engage with the moving member, the moving arm being deflected in a circumferential direction of the coil portion relative to the fixed arm by a movement of the moving member;
a drive motor accommodated within the housing and operated by the operation of the opener, the drive motor driving the moving member to retract the moving member against a biasing force of the biasing member;
the coil portion being arranged in a state in which a distance from the lid member to the coil portion is shorter than a distance from the lid member to an output shaft of the drive motor connected to the moving member;
the housing including an accommodating portion extending in a downward direction and accommodating the coil portion; and
both the accommodating portion and the output shaft of the drive motor extending in the downward direction by a respective extending amount, the extending amount of the accommodating portion being greater than the extending amount of the output shaft of the drive motor.

2. The lid lock apparatus according to claim 1, wherein a connection bore portion is formed at a lower end portion of the accommodating portion to connect inside and outside of the housing.

3. The lid lock apparatus according to claim 1, wherein the drive motor includes a motor body rotating the output shaft, the motor body being arranged at an upper side of the moving member.

4. The lid lock apparatus according to claim 1, wherein the drive motor includes a motor body rotating the output shaft, the motor body being arranged at an upper side of the moving member.

5. The lid lock apparatus according to claim 2, wherein the drive motor includes a motor body rotating the output shaft, the motor body being arranged at an upper side of the moving member.

6. The lid lock apparatus according to claim 1, wherein the housing includes a spring attachment portion projecting from an inner wall surface of the housing and including an end surface, the end surface including a recessed portion at which the fixed arm is configured to be placed, an engagement hook projecting from the spring attachment portion in a circumferential direction of the coil portion, and wherein when mounting the biasing member at the housing, the moving arm engages with the moving member and thereafter the fixed arm placed at the recessed portion moves on the end surface to engage with the engagement hook.

7. The lid lock apparatus according to claim 1, wherein the moving member includes a connection bore engaging with the moving arm, and a guide portion is formed at the housing to be positioned around the connection bore, the guide portion including first and second portions, the second portion being located rearward of the first portion in the front and rear direction, and
the guide portion being inclined such that the second portion is lower than the first portion in a depth direction of the connection bore.

8. The lid lock apparatus according to claim 1, wherein the biasing member is symmetrically formed so that either of the fixed arm and the moving arm is configured to engage with either of the housing and the moving member.

9. The lid lock apparatus according to claim 1, wherein the coil portion is located between the lid member and the output shaft of the drive motor in the front and rear direction.

* * * * *